United States Patent
Mueller

[11] 3,857,365
[45] Dec. 31, 1974

[54] WINDOW MOUNTED PLATFORM
[76] Inventor: Paul H. Mueller, P.O. Box 654, Ferndale, Calif. 95536
[22] Filed: Aug. 8, 1973
[21] Appl. No.: 387,214

[52] U.S. Cl. ............................................... 119/1
[51] Int. Cl. ........................................... A01k 29/00
[58] Field of Search ................. 119/1; 47/36, 39, 40

[56] References Cited
UNITED STATES PATENTS
| | | | |
|---|---|---|---|
| 1,627,241 | 5/1927 | Johnson | 47/40 UX |
| 3,173,398 | 3/1965 | Raymond | 119/1 |

*Primary Examiner*—Hugh R. Chamblee
*Attorney, Agent, or Firm*—Clarence A. O'Brien; Harvey B. Jacobson

[57] ABSTRACT

A portable multipurpose panel primarily for indoor use in conjunction with a vertical window and horizontal sill (wooden or metal) and which when installed, provides a convenient shelf-type utility platform preferably but not necessarily serviceable as a support surface for a pet, a cat for example. The flat top surface is provided with a readily applicable and removable launderable cover having an elastic-held hem. An outward marginal edge of the panel is equipped with a mounting bracket having an attaching flange and a vertical depending adapter flange interposed between the window frame and sill. In addition, the median lengthwise portion of the panel is uniquely bent to provide a channel which accommodatingly underlies and clears the hem. A U-shaped or equivalently constructed stabilizing prop has an upper end detachably, adjustably hingedly clipped to an inward marginal portion of the panel. A leveling and retaining chain has its lower end connected to the lower end of the prop. The links at the upper end of the chain are connectible to selectively usable keyhole-slots in a fixed cleat. A slotted opening in the median area of the panel, lined up with the cleat, provides a pocket in which links of the chain can be stored.

8 Claims, 6 Drawing Figures

PATENTED DEC 31 1974
3,857,365
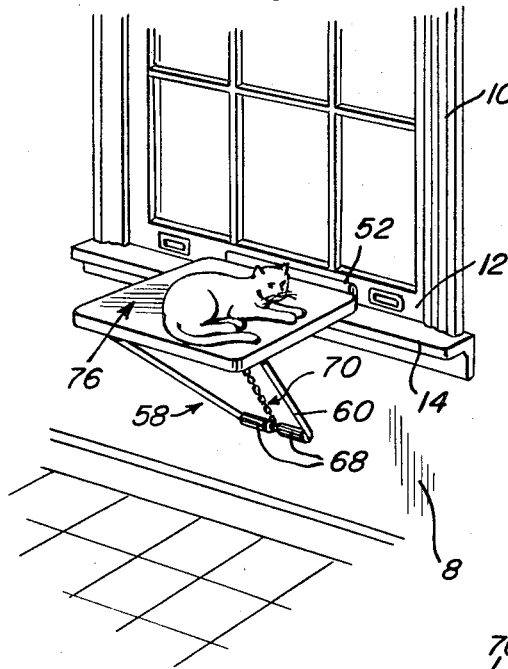
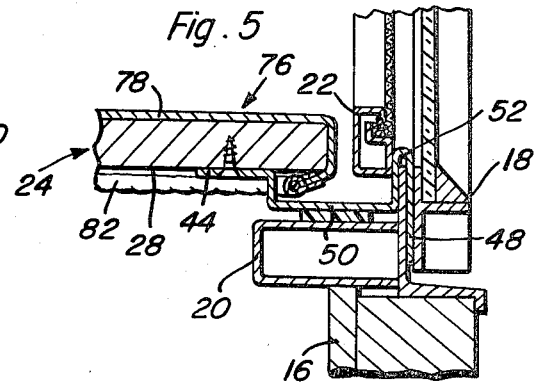
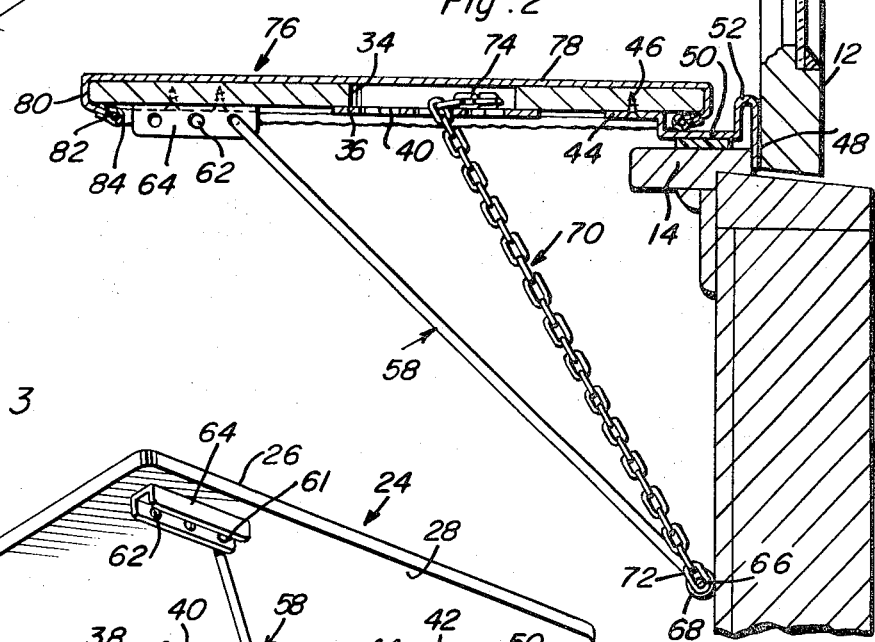
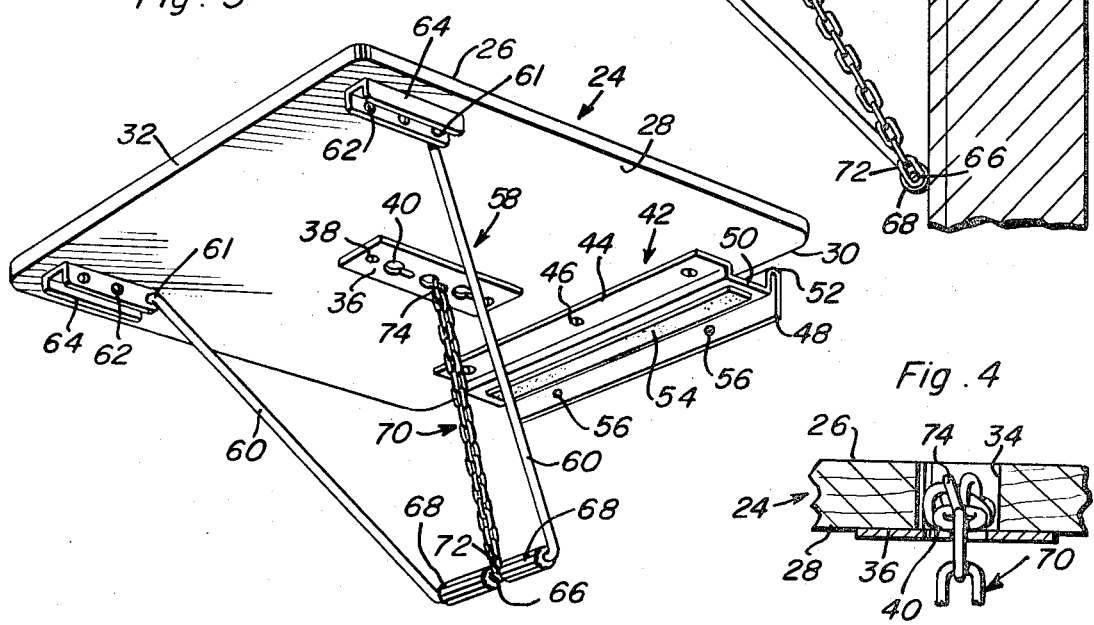
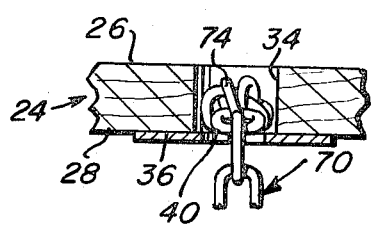

WINDOW MOUNTED PLATFORM

This invention relates to certain new and useful improvements in a portable multipurpose-type panel which while capable of practical use indoors or outdoors is customarily employed indoors, provides a utility platform, is expressly designed and adapted to be suspended from a window sill and lends itself to use as an acceptable shelf-like platform for a pet animal, a cat for example.

More specifically, the herein disclosed concept pertains to shelf-type platform, a structurally novel attaching and mounting bracket thereon, a hingedly mounted stabilizing prop, a complemental leveling and retaining chain for the prop, and a removable, soft, launderable cover spread tautly atop the platform and which, as experience has shown, promotes self-satisfying window use by a pet animal.

For background information and as indicative, generally stated, of the state of the art to which the invention relates attention is directed to the fact that U.S. Pat. No. 3,173,398 reveals that it is old, as shown by Lloyd C. Raymond to provide an elevated pet lounge characterized by means for mounting the same in alignment with a window and sill structure. Platforms of many and varied types are used for outside window cleaning use, one example being that shown in U.S. Pat. No. 1,658,942 granted to John A. Renstrom. Another outdoors type is shown as a window attachment in Anton Nelson covered in U.S. Pat. No. 1,512,792. As having a closer structural bearing on the subject matter of the invention herein under consideration attention may be directed to the adjustable window shelf shown in Erle H. Bartlett U.S. Pat. No. 1,224,127 and of interest because it shows not only an indoor type shelf but bracket means cooperable with the window sill and adjustable prop means.

An object of the present invention, broadly stated, is to structurally, functionally and in other ways improve upon prior art shelves and platforms and, in so doing, to devise a safe and practical end product and an adaptation which well and satisfactorily serves the purposes for which it has been perfected and effectually used.

Briefly the adaptation hereinafter set forth is characterized by a suitable panel which lends itself to feasible use in conjunction with a vertical window construction and complemental horizontal indoors sill. The panel provides a shelf-like platform for whatever purpose desired. Novel bracket means serves for mounting the platform or panel and embodies a one-piece unit having a horizontal bracket which underlies and is attached to an underneath surface of the panel. A complemental depending vertical flange is spaced from the attaching flange and is suitably located relative thereto and on an outward marginal edge of the panel and is coordinated for retentive connection with surface portions of a window and coordinating sill. A longitudinal extending upwardly opening trough or channel is situated between the two flanges. A U-shaped panel leveling and stabilizing prop preferably made from bendable rod stock, has legs joined at their lower ends by a bight portion equipped with compressibly resilient wall contacting sleeves. The upper ends of the legs are laterally bent preferably outwardly and provide journals. Duplicate properly paired channel-shaped clips are secured to an underneath surface of an inward marginal edge of the panel. These clips have selectively usable keeper holes and the journals are separably and hingedly as well as adjustably connected with selected keeper holes provided therefor. A median portion of the panel is provided with a chain link accommodating and pocketing slot and an aligned fixedly mounted cleat has keyhole shaped slots aligned with the pocketing slot. A leveling and retaining chain has a lower end linked and secured to an associated bight portion of the prop. The links at the upper end are detachably and adjustably connectible with selected ones of the keyhole slots. Certain of the links can be pocketed in an out-of-the-way position for storage in the manner shown. A manually applicable and removable washable pet cover is spread tautly over the top surface and the elastic equipped hem snugly and retentively fits over the coacting marginal edges of the panel.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in perspective showing a fragmentary portion of a window construction, wall and sill and showing, more particularly, the novel window mounted platform and how, generally stated, it is constructed and used.

FIG. 2 is an enlarged view in section and elevation showing the details of construction of the overall structure.

FIG. 3 is a perspective view which brings out the essential component parts with particularity, the cover being omitted.

FIG. 4 is a detail section showing the aforementioned chain-link pocketing slot and associated cleat.

FIG. 5 is a view fragmentarily presented and similar to FIG. 2 but showing a metal window and sill construction instead of the type appearing in FIG. 2.

FIG. 6 is a view on a small scale showing the device in edge elevation and also showing the prop and chain collapsed for compactness, convenience and storage.

With reference first to FIGS. 1 and 2 in particular the wall is denoted at 8, the window frame at 10, the vertically disposed window at 12 and the regular indoor sill at 14. Inasmuch as the invention is usable in conjunction with either a window structure such as that shown in FIGS. 1 and 2 and is also usable with a metal window arrangement the invention is shown in use in conjunction with a metal window as brought out in FIG. 5 and wherein the wall is denoted at 16, the window at 18, the window sill at 20 and window screen at 22. The invention is characterized by the structure appearing with particularity in FIG. 3 and which lends itself to use with window constructions of the type shown.

It is further evident that while the invention is primarily usable as a pet platform as illustrated in FIG. 1, it lends itself to use in other lines of endeavor and is therefore to be construed with or without the cover means. The primary structure is illustrated in FIG. 3 wherein it will be seen that the panel or platform is of general rectangular form with flat surfaces and is denoted by the numeral 24. The flat top surface is designated at 26 and the underneath or bottom surface at 28. The outward marginal edge is designated at 30 and the inward marginal edge at 32. The central median portion of this panel or shelf is provided with a slotted opening which is denoted at 34 in FIG. 4 and which opens through the top and bottom surfaces 28 and 26.

This slotted portion provides what is designated as a chain-link accommodation and storing pocket. Further considering this aspect of the overall construction attention is directed to a substantially rectangular plate which is here distinguished as a cleat 36, the same being attached to the underneath surface in line with the slot as at 38 (FIG. 3) and it will be noted that a plurality of longitudinally spaced keyhole slots 40 are employed and are lined up with the pocket and are capable of being selectively used in a manner to be described.

The one-piece metal or equivalent platform mounting and retaining bracket means is denoted at 42 (FIG. 3). The elongated horizontal flange 44 is secured by screws or equivalent fastenings 46 to the underneath side parallel to and inwardly of the edge 30. The vertical attaching and anchoring flange which is said to be depending relative to the flange 44 is denoted by the numeral 48 and it is capable of being interposed between and edge of the sill and the surface of the window as shown in FIG. 2 on the one hand or interposed and anchored in place on the window components in the manner shown in the modification in FIG. 5. In either event the median or intermediate portion of the bracket or plate is provided with an open-ended channel-shaped trough 50 which is offset downwardly and serves a purpose to be described. The return bend is denoted at 52 and provides the junctional connection between the flange 48 and the clearance channel 50. The underneath web portion of this channel is provided with an elongated adhesively or otherwise securely attached anti-slipping and cushioning strip 54 which in practice rests firmly atop the sill as shown. It should be noted also in FIG. 3 that the depending flange 48 is provided with holes 56 which can be utilized for attaching the flange to a wall or other support surface when applied directly to the wall and not used in the manner shown in FIGS. 1, 2 and 5.

The aforementioned hingedly detachably and adjustably mounted rod-type prop is denoted at 58. This prop is of substantially U-shaped form and the legs 60 have upper ends which are laterally bent and serve as attaching and hinging journals as at 61 in FIG. 3 in particular. These journal-like ends are selectively adjustably and detachably connectible with accommodation keeper holes 62 provided therefor in flanges of the channel-type clips 64. The bight portion which joins the lower ends of the limbs or legs together is denoted at 66 in FIG. 3 and is provided with compressibly resilient wall abutting sleeves 68. Experience has shown that for best leveling and stabilizing results a positioning and maintaining chain or equivalent flexible element is desirable. The chain shown is denoted at 70 and the lowermost link 72 is suitably anchored in place as brought out in FIG. 2. The upper links 74 are cooperable in the manner shown and to the ends desired these links are selectively and detachably connectible with the aforementioned keeper hole slots 40 in the cleat 36. The accommodation pocket 34 serves for link pocketing and storage purposes as perhaps best illustrated in FIGS. 2 and 4.

Inasmuch as the invention is primarily but not necessarily adapted as a perch and platform for pets experience has shown that it is desirable to use a readily attachable and detachable washable soft cover 76. This is made to fit tautly over the top surface of the panel as denoted at 78, the outer marginal portions 80 snugly surrounding the marginal edges of the panel and the lower edge having a hem 82 containing an elastic cord or the like 84. The cover is applied and used as best shown in FIGS. 2 and 5 and in this connection it will be seen that the downwardly offset clearance channel 50 comes into play to accommodate the hem and to facilitate applying and removing the cover. The cover also spans the pocketing slot 34 to achieve the safety result desired.

The slotted cleat 36 functions to accommodate sills of varying widths and in conjunction with the chain and prop maintains the best angle for maximum support. It is evident too that the chain is of significance in that it provides a satisfactory means of adjustment and it is pulled through the appropriate keyhole slots until the platform is level. Then, the chain is slid into the desired keyhole. This chain has two points in each link at which it may be checked. The unused chain links rest in the recessed area or pocket so that it does not interfere with the tautness and usefulness of the cover means 76.

It is believed that the views of the drawings show the details and how they are constructed and coordinated and also the manner in which the device is applied, used and collapsed when not in use as brought out in FIG. 6. Accordingly a more extended description of the invention is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A multipurpose panel designed for indoors attachment to and use in conjunction with a window structure embodying a vertical window and a complemental horizontal sill, said panel being adapted to occupy an elevated plane overhanging a room floor, constituting a shelf-like platform, and being usable as a reclining platform for a household pet, a cat for example, a readily applicable and removable comfortable and washable cover spread tautly and overlying the top surface of said platform, said cover having marginal edges fittingly encompassing coacting edges of said panel and having an elastic-equipped-hem snugly and retentively bordering said marginal edges and holding the cover in a given usable position, a stabilizing prop having an upper end attached to an underneath inward edge portion of said panel and a freely positionable lower end adapted to be propped and braced against a vertical wall surface below the plane of said sill, and bracket means secured to an underneath surface of an outwardly positionable edge portion of said panel and detachably but supportively and usably cooperable with portions of the window and sill, respectively, and prop retaining means having an upper end detachably and adjustably connected to a median underneath surface of said panel and a lower end fastened to the lower end of said prop.

2. The panel defined in claim 1 and wherein said retaining means comprises a chain, said median underneath surface having a fixed cleat and said cleat having keyhole-slots with which upper links of said chain can be selectively connected for chain adjusting and anchoring needs.

3. The panel defined in claim 2, and wherein the median portion of said panel is provided with an accommodation slot, said slot opening through the top and bottom surfaces of said panel and defining a pocket, said cleat and certain of the keyhole-slots therein being aligned with said accommodation slot and certain of the upper anchored links of said chain being adapted to be nested and stored within the confines of said pocket in the manner and for the purpose and result described.

4. The panel defined in claim 2, and wherein said stabilizing prop is substantially U-shaped and embodies coplanar legs having upper free ends which are laterally bent to provide hinging terminals, and channel-clips mounted on underneath surfaces of said panel, said clips having selectively usable keeper holes, and adjacent ones of said hinging terminals being detachably, adjustably and hingedly connected with selected keeper holes, and wherein said bracket means is provided (1) with a horizontal flange superimposed upon and secured to an underneath surface of said panel, (2) a depending vertical flange designed and adapted for retentive connection with surface portions of a window and sill, respectively, and (3) a median lengthwise clearance channel between said flanges for reception of the hem of said cover.

5. A multipurpose panel designed for indoors attachment to and use in conjunction with a window structure embodying a vertical window and a complemental horizontal sill, said panel being adapted to occupy an elevated plane overhanging a room floor, constituting a shelf-like platform, and being usable as a reclining platform for a household pet, a cat for example, a readily applicable and removable comfortable and washable cover spread tautly and overlying the top surface of said platform, said cover having marginal edges fittingly encompassing coacting edges of said panel and having an elastic-equipped-hem snugly and retentively bordering said marginal edges and holding the cover in a given usable position, a stabilizing prop having an upper end attached to an underneath inward edge portion of said panel and a freely positionable lower end adapted to be propped and braced against a vertical wall surface below the plane of said sill, and bracket means secured to an underneath surface of an outwardly positionable edge portion of said panel and detachably but supportively and usably cooperable with portions of the window and sill, respectively, said stabilizing prop being substantially U-shaped and embodies coplanar legs having upper free ends which are laterally bent to provide hinging terminals, and channel-clips mounted on underneath surfaces of said panel, said clips having selectively usable keeper holes, and adjacent ones of said hinging terminals being detachably, adjustably and hingedly connected with selected keeper holes.

6. A multipurpose panel designed for indoors attachment to and use in conjunction with a window structure embodying a vertical window and a complemental horizontal sill, said panel being adapted to occupy an elevated plane overhanging a room floor, constituting a shelf-like platform, and being usable as a reclining platform for a household pet, a cat for example, a readily applicable and removable comfortable and washable cover spread tautly and overlying the top surface of said platform, said cover having marginal edges fittingly encompassing coacting edges of said panel and having an elastic-equipped-hem snugly and retentively bordering said marginal edges and holding the cover in a given usable position; a stabilizing prop having an upper end attached to an underneath inward edge portion of said panel and a freely positionable lower end adapted to be propped and braced against a vertical wall surface below the plane of said sill, and bracket means secured to an underneath surface of an outwardly positionable edge portion of said panel and detachably but supportively and usably cooperable with portions of the window and sill, respectively, said bracket being provided (1) with a horizontal flange superimposed upon and secured to an underneath surface of said panel, (2) a depending vertical flange designed and adapted for retentive connection with surface portions of a window and sill, respectively, and (3) a median lengthwise clearance channel between said flanges for reception of the hem of said cover.

7. A multipurpose panel designed for use in conjunction with a vertical window and a complemental horizontal sill, said panel adapted to provide a shelf-like platform for whatever purpose desired, panel mounting bracket means having a horizontal bracket attaching flange secured to an underneath surface of said panel, a complemental depending vertical flange spaced from said attaching flange and suitably located relative thereto and an outward marginal edge of said panel and coordinated for retentive connection with surface portions of a window and companion sill, and a longitudinally extending upwardly opening channel situated between said flanges, a U-shaped panel leveling and stabilizing prop having legs joined at their lower ends by a bight portion equipped with compressibly resilient sleeves, the upper ends of said legs being laterally bent and providing journals, paired channel-shaped clips secured to an underneath surface of an inward marginal edge of said panel, said clips having selectively usable keeper holes and said journals being separably and hingedly and adjustably connected with the keeper holes provided therefor, a median portion of said panel being provided with a chain link pocketing slot and an aligned fixedly mounted cleat having keyhole-slots aligned with said slot, and a leveling and retaining chain having a lower end linked and secured to an associated bight portion of said prop and links at its upper end detachably and adjustably connectible with selected ones of said keyhole-slots and certain links of said chain being susceptible of pocketed placement and temporary storage in said pocketing slot.

8. The panel defined in claim 7, and, in combination, a manually applicable and removable washable pet cover spread tautly and overlying the top surface of said panel, said cover having marginal edges conformably and fittingly encompassing predetermined marginal edges of said panel and having an elastic-equipped-hem snugly and retentively fitting over the coacting marginal edges of said panel in a manner to position and hold the cover in a given usable position.

* * * * *